(12) United States Patent
Pschenitzka et al.

(10) Patent No.: US 10,307,786 B2
(45) Date of Patent: ***Jun. 4, 2019

(54) ANISOTROPY REDUCTION IN COATING OF CONDUCTIVE FILMS

(71) Applicant: CAMBRIOS FILM SOLUTIONS CORPORATION, Tortola (VG)

(72) Inventors: Florian Pschenitzka, San Francisco, CA (US); Jonathan Westwater, Kawasaki (JP)

(73) Assignee: Cambrios Film Solutions Corporation, Tortola (VG)

( * ) Notice: Subject to any disclaimer, the term of this patent is extended or adjusted under 35 U.S.C. 154(b) by 102 days.

This patent is subject to a terminal disclaimer.

(21) Appl. No.: 15/343,595

(22) Filed: Nov. 4, 2016

(65) Prior Publication Data

US 2017/0050216 A1    Feb. 23, 2017

Related U.S. Application Data

(62) Division of application No. 13/535,112, filed on Jun. 27, 2012, now Pat. No. 9,573,163.

(60) Provisional application No. 61/504,021, filed on Jul. 1, 2011, provisional application No. 61/530,814, filed on Sep. 2, 2011.

(51) Int. Cl.
*B32B 7/02* (2019.01)
*B05D 3/04* (2006.01)
*B05D 1/26* (2006.01)
*B05D 7/04* (2006.01)

(52) U.S. Cl.
CPC .............. *B05D 3/042* (2013.01); *B05D 1/26* (2013.01); *B05D 7/04* (2013.01); *B05D 2252/02* (2013.01); *B05D 2601/28* (2013.01); *Y10T 428/24372* (2015.01); *Y10T 428/25* (2015.01)

(58) Field of Classification Search
CPC ............................ B05D 1/26; B05D 2252/02; B05D 2601/28; B05D 3/042; B05D 7/04; Y10T 428/24372; Y10T 428/25
See application file for complete search history.

(56) References Cited

U.S. PATENT DOCUMENTS

| 5,293,699 A * | 3/1994 | Faust | ................... F26B 21/004 226/196.1 |
| 2008/0143906 A1* | 6/2008 | Allennand | ............. B82Y 10/00 349/43 |
| 2010/0307792 A1* | 12/2010 | Allemand | ............. B82Y 10/00 174/126.1 |

* cited by examiner

*Primary Examiner* — Lawrence D Ferguson
(74) *Attorney, Agent, or Firm* — Cooper Legal Group, LLC

(57) ABSTRACT

Provided herein is a method of forming a conductive film, the method comprising: providing a coating solution having a plurality of conductive nanostructures and a fluid carrier; moving a web in a machine direction; forming a wet film by depositing the coating solution on the moving web, wherein the wet film has a first dimension extending parallel to the machine direction and a second dimension transverse to the machine direction; applying an air flow across the wet film along the second dimension, whereby at least some of the conductive nanostructures in the wet film are reoriented; and allowing the wet film to dry to provide the conductive film.

8 Claims, 4 Drawing Sheets

ANISOTROPY REDUCTION IN COATING OF CONDUCTIVE FILMS

CROSS-REFERENCE TO RELATED APPLICATIONS

This application is a divisional application of U.S. application Ser. No. 13/535,112, filed on Jun. 27, 2012, which claims the benefit under 35 U.S.C. § 119(e) of U.S. Provisional Patent Application Nos. 61/504,021, filed Jul. 1, 2011, and 61/530,814, filed Sep. 2, 2011. The entire contents of the above-referenced applications are incorporated herein by reference in their entireties.

BACKGROUND

Conductive nanostructures, owing to their submicron dimensions, are capable of forming thin conductive films. Often the thin conductive films are optically transparent, also referred to as "transparent conductors." Copending and co-owned U.S. patent application Ser. Nos. 11/504,822, 11/871,767, and 11/871,721 describe transparent conductors formed by interconnecting anisotropic conductive nanostructures such as metal nanowires. Nanostructure-based transparent conductors are particularly useful as transparent electrodes such as those coupled to thin film transistors in electrochromic displays, including flat panel displays and touch screens. In addition, nanostructure-based transparent conductors are also suitable as coatings on color filters and polarizers, and so forth. The above co-pending applications are incorporated herein by reference in their entireties.

To prepare a conductive film or a nanostructure network layer, a liquid dispersion of the nanostructures can be deposited on a substrate, followed by a drying or curing process. The liquid dispersion is also referred to as an "ink composition" or "ink formulation." The ink composition typically comprises nanostructures (e.g., metal nanowires) and a liquid carrier (or dispersant). Optional agents, such as a binder, a viscosity modifier, and/or surfactants, may also be present to facilitate dispersion of the nanostructures and/or immobilization of the nanostructures on the substrate.

A thin film of a nanostructure network layer is formed following the ink deposition and after the dispersant is at least partially dried or evaporated. The nanostructure network layer thus comprises nanostructures that are randomly distributed and interconnect with one another and with the other non-volatile components of the ink composition, including, for example, the binder, viscosity modifier and surfactant.

As disclosed in co-owned U.S. patent application Ser. No. 11/504,822 cited above, roll-to-roll web coating is compatible with such solution-based deposition (coating) processes for transparent conductor fabrication. In particular, web-coating produces substantially uniform and reproducible conductive films on flexible substrates ("web"). Suitable roll-to-roll deposition processes can include, but are not limited to, slot die, gravure, reverse gravure, micro-gravure, reverse roll and Mayer-bar. There is a need to further enhance the uniformity and reproducibility of conductive films.

BRIEF SUMMARY

One embodiment provides a method of forming a conductive film, the method comprising:
providing a coating solution having a plurality of conductive nanostructures and a fluid carrier;
moving a web in a machine direction;
forming a wet film by depositing the coating solution on the moving web, wherein the wet film has a first dimension extending parallel to the machine direction and a second dimension transverse to the machine direction;
applying an air flow across the wet film along the second dimension, whereby at least some of the conductive nanostructures in the wet film are reoriented; and
allowing the wet film to dry to provide the conductive film.

Another embodiment provides a conductive film formed according to the above method, where, when a first sheet resistance along the first dimension ($R_{MD}$) and a second sheet resistance along the second dimension ($R_{TD}$) are measured at a given location on the conductive film, a ratio ($R_{TD}/R_{MD}$) of the second sheet resistance and the first sheet resistance defines an anisotropy of the sheet resistances, and wherein the anisotropy is less than 2, or less than 1.5, or less than 1.4, or less than 1.2.

Yet another embodiment provides a conductive film, wherein anisotropies are measured at a plurality of locations across the second dimension to provide a maximum anisotropy and a minimum anisotropy, and wherein the difference between the maximum anisotropy and the minimum anisotropy is less than 25%, less than 20%, or less than 15%, or less than 10%, or less than 5% of the minimum anisotropy.

A further embodiment provides a method of forming a conductive film, the method comprising:
forming a wet film having a plurality of conductive nanostructures and a fluid carrier, wherein the wet film has a first dimension and a second dimension transverse to the first dimension; and
applying an air flow across the wet film along the second dimension, whereby at least some of the conductive nanostructures in the wet film are reoriented.

Yet another embodiment provides a conductive film comprising a plurality of conductive nanostructures, wherein a first dimension of the conductive film is perpendicular to a second dimension of the conductive film and a first sheet resistance ($R_{MD}$) along the first dimension and a second sheet resistance ($R_{TD}$) along the second dimension are measured at a given location on the conductive film, and wherein a ratio ($R_{TD}/R_{MD}$) of the second sheet resistance and the first sheet resistance defines an anisotropy of the sheet resistances, wherein the anisotropy is less than 2, or less than 1.5, or less than 1.4, or less than 1.2.

DETAILED DESCRIPTION

In roll-to-roll coating processes, the direction in which the coated substrate travels is referred to herein as the machine direction ("MD"). The direction transverse (i.e., at a right angle) to the MD is referred to as the cross-web or transverse direction ("TD"). During the roll-to-roll deposition of an ink composition of nanowires, it has been observed that the deposited nanowires may show increased tendency to align in the machine direction when compared to the transverse direction. Such variation in alignment may lead to a longer range of connectivity of nanowires in the machine direction as compared to that in the transverse direction. This can give rise to an anisotropy in transparent conductor sheet resistance wherein such sheet resistance is lower in the machine direction ($R_{MD}$) than it is in the transverse direction ($R_{TD}$).

Provided herein is a post-deposition treatment to decrease the difference between $R_{MD}$ and $R_{TD}$ by applying a cross-web air flow immediately after the deposition of the nanowires solution. It is believed that the anisotropy observed in nanowire alignment is caused by preferential alignment of the nanowires due to shear in the coating bead or in the slot die during the coating process.

Figure 1:
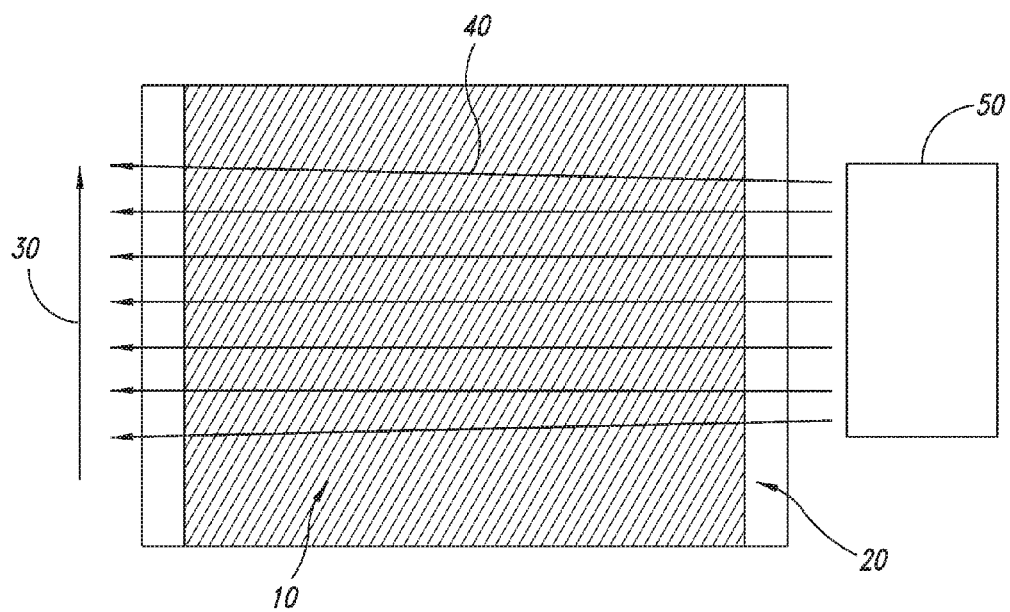
FIG. 1 shows the basic concept of cross-web air flow to reduce anisotropy of sheet resistance.

Rather than addressing this anisotropy during the deposition itself, reduction of the nanowires' preferential alignment in MD can be achieved after the deposition of the wet film and when the film is still sufficiently fluid to allow for laminar flow. As shown in FIG. 1, a wet film or coating (10) is formed on a moving web (20) in a machine direction (30). Before the wet film dries or cures, an air flow (40) is applied, from an air supply (50) (e.g., an air knife), in a direction substantially transverse to the machine direction (30). It was observed that the air flow can reduce or eliminate any preferential alignment of the nanowires that may occur during deposition. It is believed that the laminar flow across the wet film leads to a certain degree of reorientation of the nanowires, especially those that have previously aligned along the machine direction (i.e., perpendicular to the laminar flow).

Thus, one embodiment provides a method of forming a conductive film, the method comprising:

(a) providing a coating solution having a plurality of conductive nanostructures and a fluid carrier;

(b) moving a web in a machine direction;

(c) forming a wet film by depositing the coating solution on the moving web, wherein the wet film has a first dimension extending parallel to the machine direction and a second dimension transverse to the machine direction;

(d) applying an air flow across the wet film along the second dimension, whereby at least some of the conductive nanostructures in the wet film are reoriented; and (e) allowing the wet film to dry to provide the conductive film.

In various embodiments, the depositing step comprises continuously pressuring the coating solution from a reservoir onto the moving web (i.e., by a slot die method).

In further various embodiments, the air flow is continuously applied as the wet film travels along the machine direction. Preferably, the air flow is applied immediately after the wet film is deposited, to ensure that the wet film is fluid enough to allow the conductive nanostructures to reorient themselves. The time interval between the deposition and air flow depends, to a certain extent, on the volatility and amount of the liquid carrier. For an aqueous-based coating solution, air flow should start within 5 seconds, or within 10 seconds, or within 20 seconds or within 30 seconds from deposition. It is important that at the time of the air flow, the film has not undergone any significant drying and therefore the nanowires could still be reoriented by external means.

The air flow can be supplied by any means known to a skilled person in the art. Typically, the source of air flow may be, for example, an air knife located on one side of the moving web, or an air channel or duct overhanging the moving web. Also shown in FIGS. 2-5, the source of the air flow may be designed to provide a uniform air flow across the entire width of the wet film (i.e., along the second dimension). The wet film is then allowed to fully dry.

Without the post-deposition treatment, the anisotropy of sheet resistance (defined as the ratio of TD sheet resistance to the MD sheet resistance) may be as high as 2. In various embodiments in accordance with the present disclosure, the anisotropy of the sheet resistance can be less than 2, or less than 1.5, or less than 1.4, or less than 1.2.

Figure 2:
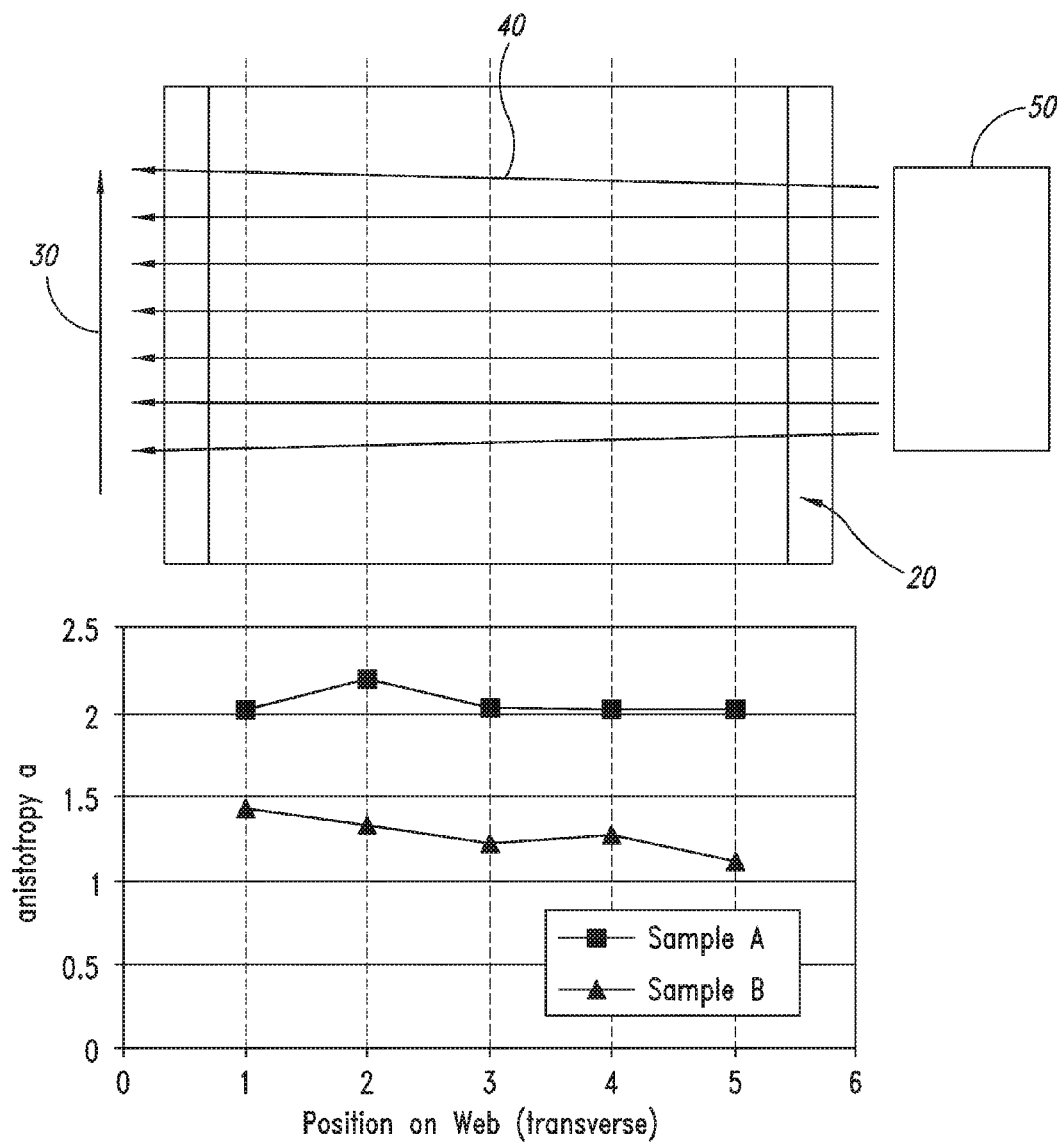
FIG. 2 demonstrates the anisotropy reduction as a function of the position (Sample A was fabricated using the cross-web air flow, Sample B is a control sample fabricated without the cross-web air flow)

The laminar flow on the side proximal to the air supply, due to more air flow at this position, is typically stronger than the laminar flow at a lateral location farther away from the air supply. Consequently, the effect of the laminar flow on the alignment of the nanowires can also be more pronounced, as seen in the graph in FIG. 2. FIG. 2 shows the anisotropy of sheet resistance as a function of the locations of measurement in Sample A (without cross-web air flow) and Sample B (with cross-web air flow). The anisotropy on the right side (proximal to the air supply) was reduced from 2 to 1.2. On the left side (farther away from the air supply), the reduction was only from 2 to 1.4.

In the set up as shown in FIG. 2, a standard air knife is preferably used to generate air flow across the coated film. More specifically, a blower channeled through an approximately 15 cm×xxx 1 cm rectangular opening was placed at the level of the coated film approximately 0.5 mm to 10 mm from the edge of the coated film. The air velocity was from 0.1 m/s to 10 m/s and preferably around 1 m/s. The width of the coated film was 30 cm. As show in the graph of FIG. 2, the anisotropy of the coated film was reduced from 2 or greater to 1.5 or less to produce a silver nanowire transparent conductive with an anisotropy of no more than 1.5.

FIG. 3A and FIG. 3B illustrate the effect of laminar flow as evidenced by the microscopic alignments of the nanowires. FIG. 3A shows nanowire alignment in a conductive film without the air flow treatment. As shown, more nanowires are aligned in the machine direction (MD) that those that are not, indicating preferential alignments due to shear. For nanowires that have undergone laminar flow, as shown in FIG. 3B, there is little evidence of preferential alignment due to the reorientation of the nanowires.

Thus, a further embodiment provides a conductive film, wherein when a first sheet resistance along the first dimension (i.e., the machine direction) and a second sheet resistance along the second dimension (i.e., the transverse direction) are measured at a given location on the conductive film, a ratio of the second sheet resistance and the first sheet resistance defines an anisotropy of the sheet resistances, wherein the anisotropy is less than 2, or less than 1.5, or less than 1.4, or less than 1.2, or in the range of 1-1.5, or in the range of 1.2-1.5, or in the range of 1.4-1.5.

The sheet resistances along the MD ($R_{MD}$) and TD ($R_{TD}$) can be measured by first cutting out pieces of a coated film, for example, peaces that measure 5 cm×5 cm each, and measuring by a two-point probe. Typically, the two-point probe has two stripes of conductive rubber (each 2.5 cm long) that are spaced 2.5 cm apart. Other dimensions are also suitable, as readily recognized by a skilled person in the art.

Figure 3:
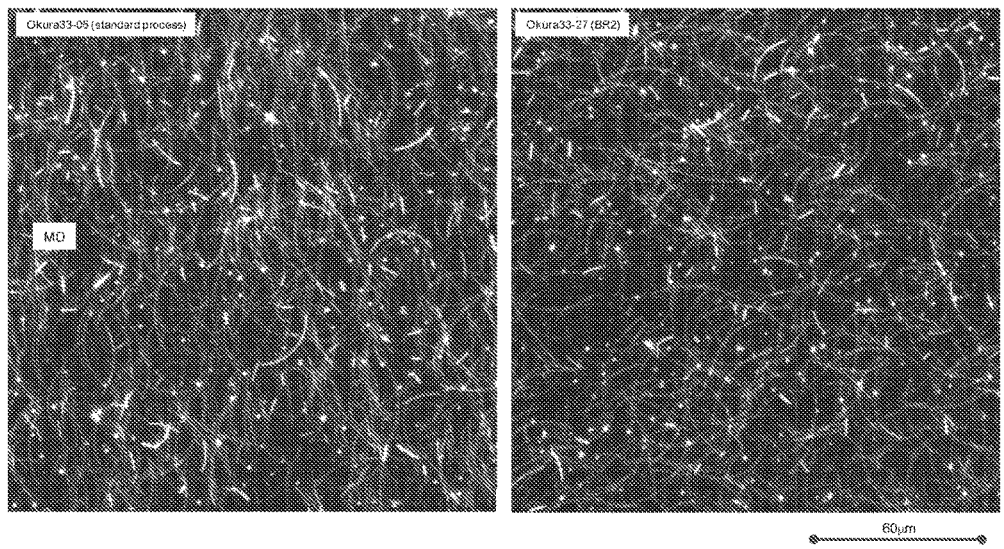
FIGS. 3A and 3B show micrographs of nanowires deposited without cross-web air flow (A) and with cross-web air flow (B).

FIGS. 2-3 also show that there may be some advantage to providing a cross-web flow with constant air-speed over the full width of the web in order to induce a more uniform reduction of the anisotropy at all points across the width of the web.

Thus, in a further embodiment, anisotropies are measured at a plurality of locations across the second dimension to provide a maximum anisotropy and a minimum anisotropy, and wherein the difference between the maximum anisotropy and the minimum anisotropy is less than 25% of the minimum anisotropy. In other embodiments, the difference is less than 20%, or less than 15%, or less than 10%, or less than 5% of the minimum anisotropy.

Figure 4:
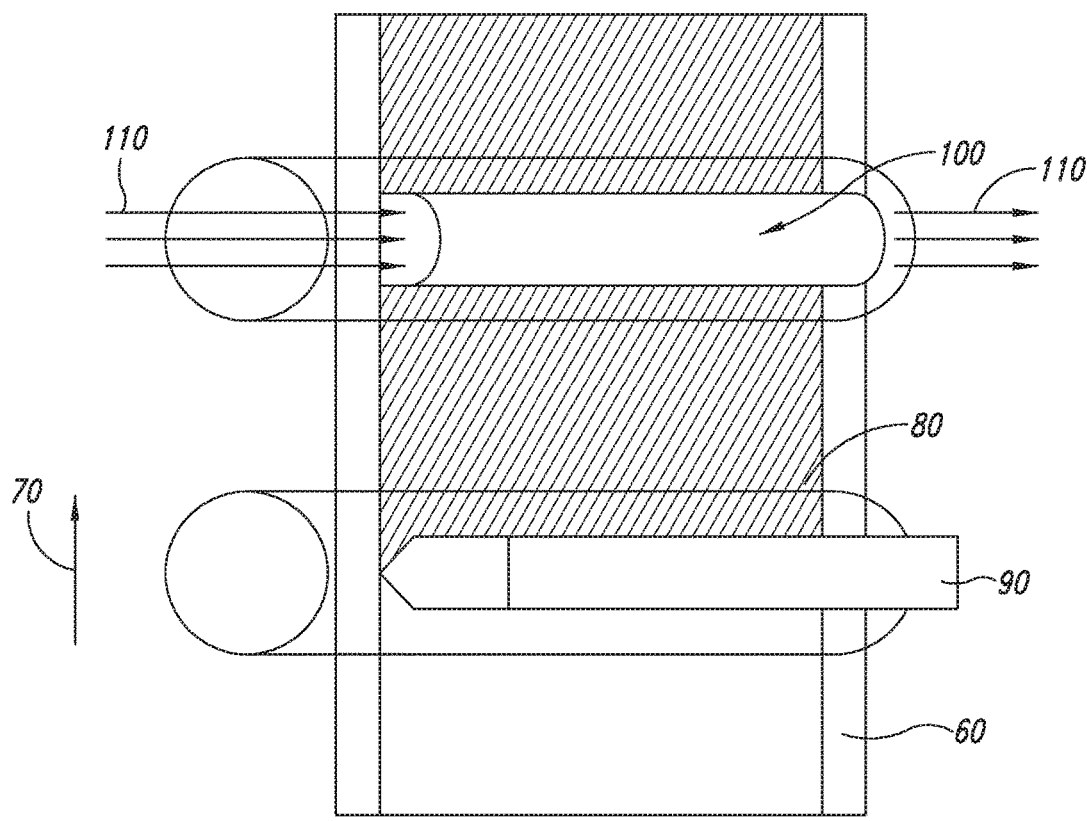
FIG. 4 is a schematic implementation of the cross-web air flow using an air duct as a channeling device.

Shown in FIG. 4 is a schematic design of a duct device (100) which channels the cross-web air flow to help create an air flow with constant velocity but does not touch the web. As shown, on a web (60) that is moving in a machine direction (70), a wet film (80) is formed through slot die deposition (90). Before the wet film (80) dries or cures, an air flow (110) is applied, from an air duct (100) in a direction substantially transverse to the machine direction (70). The duct should not touch the web directly, to avoid damaging or disturbing the wet coating. Some air may be lost because a hermetic seal is impossible to install between the duct and the web. To correct for this loss, the duct can be modified so that the cross section of the duct is smaller at the outlet than at the inlet.

The duct may be placed close to a roller in the web coating line or close to a flat area between rollers. The duct may be fabricated of any suitable, rigid material (e.g., aluminum). Preferably, the duct is approximately 2.5 cm in width, 1 cm tall and spans the width of the coated film. The duct can have a semi-circular cross section, square cross section, rectangular cross section or other shaped cross section. The bottom edges of the duct are preferably placed from about 0.1 mm to about 10 mm from the top surface of the coated film. The duct can be coupled to an air supply source at the opening of the duct near the edge of the coated film, as shown in FIG. 4. The source for the cross-flowing air can be a blower, air compressor or other cross-flow air source.

Figure 5:
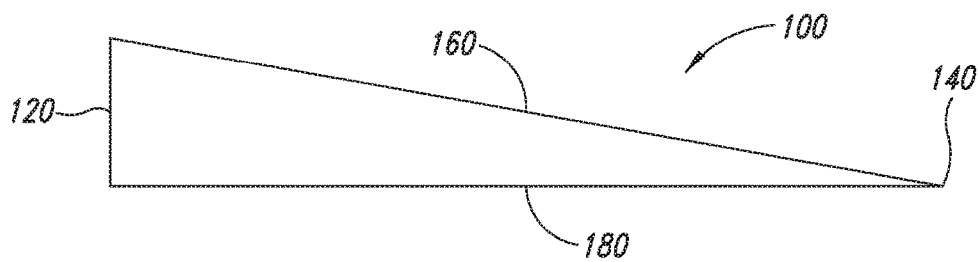
FIG. 5 is a side view of an air duct that provides a substantially uniform amount of air flow across the entire width of the wet film.

In order to maintain a more constant air flow across the entire width of the coated film when using the rigid duct, the volume of the interior of the duct may be gradually reduced along its length. One embodiment of this structure is shown in FIG. 5, which is a side view of one embodiment of a rigid duct 100 in accordance with the present disclosure. As shown, the cross-sectional area of the duct is reduced from the proximal air-supply end 120 of the duct to the distal end 140 of the duct. The air-supply end 120 is preferably coupled to a moving air supply, the upper sloped face of the duct 160 is closed and the lower face (180) of the duct is open to the coating film (not shown), which passes beneath the duct.

In more general terms, a potential anisotropy in sheet resistance, regardless of the specific factors that give rise to the anisotropy, can be mitigated or eliminated by a method involving air flow. Thus, a further embodiment provides a method of forming a conductive film, the method comprising:

(a) forming a wet film having a plurality of conductive nanostructures and a fluid carrier, wherein the wet film has a first dimension and a second dimension transverse to the first dimension; and (b) applying an air flow across the wet film along the second dimension, whereby at least some of the conductive nanostructures in the wet film are reoriented.

In various further embodiments, the method comprises the step of allowing the wet film to dry to provide the conductive film after the air flow is applied.

In a more specific embodiment, the wet film is continuously formed on a moving substrate, the moving substrate traveling along the first dimension. In a particularly preferred embodiment, the wet film is formed by slot die coating in a roll-to-roll process.

In further embodiments, the air flow is continuously applied as the wet film travels.

The conductive film thus formed is characterized with an anisotropy, as defined herein, of less than 2. In more specific embodiments, the anisotropy is less than 1.5, or less than 1.4, or less than 1.2, or in the range of 1-1.5, or in the range of 1.2-1.5, or in the range of 1.4-1.5.

Thus, one embodiment provides A conductive film comprising a plurality of conductive nanostructures, wherein a first dimension of the conductive film is perpendicular to a second dimension of the conductive film and a first sheet resistance ($R_{MD}$) along the first dimension and a second sheet resistance ($R_{TD}$) along the second dimension are measured at a given location on the conductive film, and wherein a ratio ($R_{TD}/R_{MD}$) of the second sheet resistance and the first sheet resistance defines an anisotropy of the sheet resistances, wherein the anisotropy is less than 2, or less than 1.5, or less than 1.4, or less than 1.2.

In various other embodiments, the anisotropies are measured at a plurality of locations across the second dimension to provide a maximum anisotropy and a minimum anisotropy, and wherein the difference between the maximum anisotropy and the minimum anisotropy is less than 25%, or less than 20%, or less than 15%, or less than 10%, or less than 5% of the minimum anisotropy.

The various components are described in more detail below.

Conductive Nanostructures

Generally speaking, the transparent conductors described herein are thin conductive films of conductive nanostructures. In the transparent conductor, one or more electrically conductive paths are established through continuous physical contacts among the nanostructures. A conductive network of nanostructures is formed when sufficient nanostructures are present to reach an electrical percolation threshold. The electrical percolation threshold is therefore an important value above which long range connectivity can be achieved.

As used herein, "conductive nanostructures" or "nanostructures" generally refer to electrically conductive nano-sized structures, at least one dimension of which is less than 500 nm, more preferably, less than 250 nm, 100 nm, 50 nm or 25 nm.

The nanostructures can be of any shape or geometry. In certain embodiments, the nanostructures are isotropically shaped (i.e., aspect ratio=1). Typical isotropic nanostructures include nanoparticles. In preferred embodiments, the nanostructures are anisotropically shaped (i.e., aspect ratio≠1). As used herein, "aspect ratio" refers to the ratio between the length and the width (or diameter) of the nanostructure. The anisotropic nanostructure typically has a longitudinal axis along its length. Exemplary anisotropic nanostructures include nanowires and nanotubes, as defined herein.

The nanostructures can be solid or hollow. Solid nanostructures include, for example, nanoparticles and nanowires. "Nanowires" thus refers to solid anisotropic nanostructures. Typically, each nanowire has an aspect ratio (length:diameter) of greater than 10, preferably greater than 50, and more preferably greater than 100. Typically, the nanowires are more than 500 nm, more than 1 μm, or more than 10 μm long.

Hollow nanostructures include, for example, nanotubes. Typically, the nanotube has an aspect ratio (length:diameter) of greater than 10, preferably greater than 50, and more preferably greater than 100. Typically, the nanotubes are more than 500 nm, more than 1 μm, or more than 10 μm in length.

The nanostructures can be formed of any electrically conductive material. Most typically, the conductive material is metallic. The metallic material can be an elemental metal (e.g., transition metals) or a metal compound (e.g., metal oxide). The metallic material can also be a bimetallic material or a metal alloy, which comprises two or more types of metal. Suitable metals include, but are not limited to, silver, gold, copper, nickel, gold-plated silver, platinum and palladium. The conductive material can also be non-metallic, such as carbon or graphite (an allotrope of carbon).

Conductive Film

Through a solution-based approach, a conductive film is first formed as a wet film by depositing an ink composition on a substrate, the ink composition comprising a plurality of nanostructures and a liquid carrier. As the liquid carrier (a volatile component) of the wet film fully dries, a conductive film is formed. The conductive film comprises nanostructures that are randomly distributed and interconnect with one another. As the number of the nanostructures reaches the percolation threshold, the thin film is electrically conductive. Thus, unless specified otherwise, as used herein, "conductive film" refers to a nanostructure network layer formed of networking and percolative nanostructures combined with any of the non-volatile components of the ink composition, including, for example, one or more of the following: viscosity modifier, surfactant and corrosion inhibitor.

The liquid carrier for the dispersion may be water, an alcohol, a ketone or a combination thereof. Exemplary alcohols may include isopropanol (IPA), ethanol, diacetone alcohol (DAA) or a combination of IPA and DAA. Exemplary ketones may include methyl ethyl ketone (MEK) and methyl propyl ketone (MPK).

The surfactants serve to reduce aggregation of the nanostructures and/or the light-scattering material. Representative examples of suitable surfactants include fluorosurfactants such as ZONYL® surfactants, including ZONYL® FSN, ZONYL® FSO, ZONYL® FSA, ZONYL® FSH (DuPont Chemicals, Wilmington, Del.), and NOVEC™ (3M, St. Paul, Minn.). Other exemplary surfactants include non-ionic surfactants based on alkylphenol ethoxylates. Preferred surfactants include, for example, octylphenol ethoxylates such as TRITON™ (×100, ×114, ×45), and nonylphenol ethoxylates such as TERGITOL™ (Dow Chemical Company, Midland Mich.). Further exemplary non-ionic surfactants include acetylenic-based surfactants such as DYNOL® (604, 607) (Air Products and Chemicals, Inc., Allentown, Pa.) and n-dodecyl β-D-maltoside.

The viscosity modifier serves as a binder that immobilizes the nanostructures on a substrate. Examples of suitable viscosity modifiers include hydroxypropyl methylcellulose (HPMC), methyl cellulose, xanthan gum, polyvinyl alcohol, carboxy methyl cellulose, and hydroxy ethyl cellulose.

In particular embodiments, the weight ratio of the surfactant to the viscosity modifier in the coating solution is preferably in the range of about 80:1 to about 0.01:1; the weight ratio of the viscosity modifier to the conductive nanostructures is preferably in the range of about 5:1 to about 0.000625:1; and the weight ratio of the conductive nanostructures to the surfactant is preferably in the range of about 560:1 to about 5:1. The ratios of components of the coating solution may be modified depending on the substrate and the method of application used. A preferred viscosity range for the coating solution is between about 1 cP and 100 cP.

The electrical conductivity of the conductive film is often measured by "sheet resistance," which is represented by Ohms/square (or "ohms/sq"). The sheet resistance is a function of at least the surface loading density, the size/shapes of the nanostructures, and the intrinsic electrical property of the nanostructure constituents. As used herein, a thin film is considered conductive if it has a sheet resistance of no higher than $10^8$ ohms/sq. Preferably, the sheet resistance is no higher than $10^4$ ohms/sq, 3,000 ohms/sq, 1,000 ohms/sq, or 350 ohms/sq, or 100 ohms/sq. Typically, the sheet resistance of a conductive network formed by metal nanostructures is in the ranges of from 10 ohms/sq to 1000 ohms/sq, from 100 ohms/sq to 750 ohms/sq, from 50 ohms/sq to 200 ohms/sq, from 100 ohms/sq to 500 ohms/sq, or from 100 ohms/sq to 250 ohms/sq, or from 10 ohms/sq to 200 ohms/sq, from 10 ohms/sq to 50 ohms/sq, or from 1 ohms/sq to 10 ohms/sq. For the opto-electrical devices described herein, the sheet resistance is typically less than 20 ohms/square, or less than 15 ohms/square, or less than 10 ohms/square.

Optically, the nanostructure-based transparent conductors have high light transmission in the visible region (400 nm-700 nm). Typically, the transparent conductor is considered optically clear when the light transmission is more than 70%, or more typically more than 85% in the visible region. More preferably, the light transmission is more than 90%, more than 93%, or more than 95%. As used herein, unless specified otherwise, a conductive film is optically transparent (e.g., more than 70% in transmission). Thus, the terms transparent conductor, transparent conductive film, layer or coating, conductive film, layer or coating, and transparent electrode are used interchangeably.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A conductive film, comprising:
   a plurality of conductive nanostructures, wherein:
   at least some of the plurality of conductive nanostructures are reoriented,
   the conductive film has a first dimension and a second dimension perpendicular to the first dimension,
   both the first and the second dimensions are perpendicular to a normal of the conductive film,
   the conductive film has an anisotropy, which is defined as a ratio (RTD/RMD) of a first sheet resistance (RMD) and a second sheet resistance (RTD),
   the first sheet resistance (RMD) is measured at a given location along the first dimension and the second sheet resistance (RTD) is measured at the given location along the second dimension, and the anisotropy is greater than 1 and less than 1.5 according to a reorientation of the at least some of the plurality of conductive nanostructures.

2. The conductive film of claim 1, wherein:

the conductive film has a plurality of anisotropies, each of the plurality of anisotropies is defined as the ratio (RTD/RMD) of the first sheet resistance (RMD) and the second sheet resistance (RTD), for each of the plurality of anisotropies, the first sheet resistance (RMD) is measured at a given location along the first dimension and the second sheet resistance (RTD) is measured at the given location along the second dimension, the conductive film has a maximum anisotropy and a minimum anisotropy among the plurality of anisotropies, and a difference between the maximum anisotropy and the minimum anisotropy is less than 25% of the minimum anisotropy according to a reorientation of the at least some of the plurality of conductive nanostructures.

3. The conductive film of claim 2, wherein the difference between the maximum anisotropy and the minimum anisotropy is less than 10% of the minimum anisotropy.

4. The conductive film of claim 1, wherein the plurality of conductive nanostructures have a hollow core.

5. The conductive film of claim 1, wherein the plurality of conductive nanostructures have a solid core.

6. The conductive film of claim 1, wherein the plurality of conductive nanostructures are isotropically-shaped.

7. The conductive film of claim 1, wherein the plurality of conductive nanostructures are anisotropically-shaped.

8. The conductive film of claim 1, wherein the plurality of conductive nanostructures are silver nanowires.

* * * * *